(12) United States Patent
Engebretsen

(10) Patent No.: US 8,560,539 B1
(45) Date of Patent: Oct. 15, 2013

(54) QUERY CLASSIFICATION

(75) Inventor: Lars Engebretsen, Zurich (CH)

(73) Assignee: Google Inc., Mountain View, CA (US)

( * ) Notice: Subject to any disclaimer, the term of this patent is extended or adjusted under 35 U.S.C. 154(b) by 522 days.

(21) Appl. No.: 12/511,450

(22) Filed: Jul. 29, 2009

(51) Int. Cl.
*G06F 7/00* (2006.01)

(52) U.S. Cl.
USPC .......................................... 707/736; 707/771

(58) Field of Classification Search
None
See application file for complete search history.

(56) References Cited

U.S. PATENT DOCUMENTS

| | | | |
|---|---|---|---|
| 6,775,660 B2 * | 8/2004 | Lin et al. ............................... | 1/1 |
| 8,024,337 B1 * | 9/2011 | Baluja et al. .................. | 707/736 |
| 2004/0260677 A1 * | 12/2004 | Malpani et al. .................... | 707/3 |
| 2006/0288038 A1 * | 12/2006 | Zheng et al. ................... | 707/102 |
| 2007/0061311 A1 * | 3/2007 | Kurose ............................... | 707/3 |
| 2008/0010253 A1 * | 1/2008 | Sidhu et al. ....................... | 707/3 |
| 2008/0059508 A1 * | 3/2008 | Lu et al. ......................... | 707/102 |
| 2009/0100032 A1 * | 4/2009 | Jones et al. ....................... | 707/4 |

OTHER PUBLICATIONS

Broder et al., "Robust Classification of Rare Queries Using Web Knowledge." SIGIR 07, Jul. 23-27, 2007.

* cited by examiner

*Primary Examiner* — Fred I Ehichioya
*Assistant Examiner* — Hasanul Mobin
(74) *Attorney, Agent, or Firm* — Fish & Richardson P.C.

(57) ABSTRACT

A query classification system classifies queries based on query features of search queries and a query classification model. The query classification model can be trained to classify a search query based on the query features independent of (e.g., without accessing) search results or other search log data for the search query. The query classification model can be trained based on query data and search log data corresponding to a plurality of labeled queries.

17 Claims, 4 Drawing Sheets

QUERY CLASSIFICATION

BACKGROUND

The Internet enables access to resources, such as video or audio files, web pages for particular subjects, book articles, or news articles. A search system can identify resources in response to a search query that includes one or more search terms or phrases. The search system ranks the resources based on their relevance to the search query and resource importance to provide search results that reference the identified resources. The search results are typically ordered according to a rank score that is assigned to each of the resources based on the relevance of the resource to the search query.

When a search query is unambiguously directed to a particular topic, search results that are closely related to the particular topic can be identified based solely on the terms of the search query. Sometimes, however, the particular topic for which information is being requested may not be clear from the terms of the search query alone. Therefore, search queries can be classified based on the particular topic for which information is being requested.

SUMMARY

In one general aspect, an unserviced query and query data corresponding to the unserviced query are identified, the unserviced query is classified based on application of a query classification model to the query data corresponding to the unserviced query to generate a classified query, and the classified query is provided to a query processing system. The unserviced query is a query for which search log data and/or search results are inaccessible within a threshold time, and the query classification model is trained based on query data and search log data corresponding to queries labeled by an unlabeled query classifier. This aspect may be implemented using methods, systems, apparatus, and computer program products.

These and other implementations can optionally include one or more of the following features. For example, the query processing system can be a query search system or an advertisement management system. The query data corresponding to the unserviced query can specify at least one feature selected from the group consisting of a word of the unserviced query, a language of the unserviced query, a geographic location associated with the unserviced query, and a receipt time of the unserviced query. The language associated with the unserviced query can include the language selected in the user device from which the unserviced query originates. The geographic location associated with the unserviced query can include a geographic location of a user device from which the unserviced query originates. The query classification model also can include a vector of feature weights corresponding to features of queries. The query classification model can be defined as trained when a training condition is satisfied. The unserviced query can be classified as a member of a query category that is indicative of a category of content to which the unserviced query corresponds. The query category can include an explicit content category.

In addition, first query data and first search log data corresponding to a plurality of labeled queries can be accessed and used to train the unlabeled query classifier. In this case, the first query data specifies features of each labeled query and the first search log data includes data generated by a search system in response to the labeled queries. Thereafter, second query data and second search log data corresponding to a set of unlabeled queries may be accessed, where the second query data specifies features of each unlabeled query and the second search log data includes data generated by a search system in response to the unlabeled queries. The unlabeled queries are then classified with the unlabeled query classifier based on the query data and the search log data.

Particular embodiments of the subject matter described in this specification can be implemented so as to realize one or more of the following advantages. Query classification efficiency may be increased by classifying queries based on the query data associated with the unserviced query without accessing a search system. Query classification accuracy may be increased by training a query classification model based on queries that are labeled based on the query data and search log data associated with the queries.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A query classification system classifies queries based on query features of search queries and a query classification model. Query features identify one or more characteristics of a query. For example, query features can include one or more words of the search query and a query context associated with the search query. A query context specifies a context in which a query is received. A query context can include data specifying a language in which the query was submitted (e.g., a language selected in a user device and/or a language indicator associated with the query corresponding to the language selection of the user device), a geographic region from which the query originates (e.g., a location of a user device), and/or a time of day that the query is received. The query classification model can classify a search query based on the query features independent of (e.g., without accessing) search results or other search log data for the search query.

The query classification model is trained based on labeled queries and corresponding query contexts of the labeled queries. The labeled queries are stored search queries that have been labeled according to a query category based on search log data, the term(s) and/or phrase(s), and query contexts. A query category is a category that represents a subject matter of content being requested by a search query.

The query classification model can be trained using a machine learning system such as a support vector machine. The model is identified as trained when a training condition is satisfied. The training condition is a condition indicating that the model can accurately classify queries. The training condition used can depend on the machine learning system used. For example, if the model is trained using a support vector machine, the training condition can be satisfied when a minimum distance is realized between a vector of feature weights and results of application of the model to the query features of labeled queries.

Figure 1:
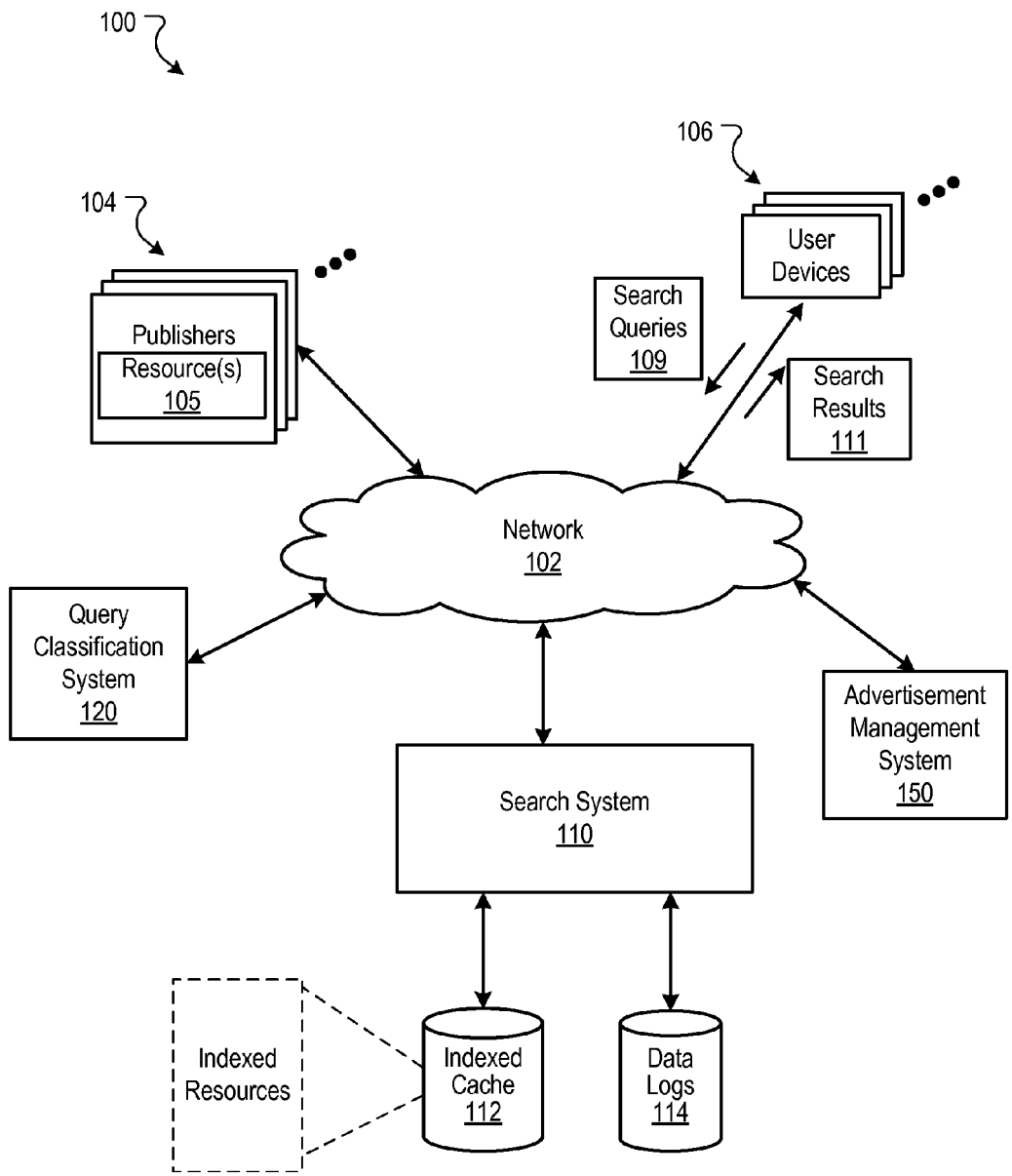
FIG. 1 is a block diagram of an example environment in which search queries are serviced.

FIG. 1 is block diagram of an example environment 100 in which search queries 109 are serviced. A computer network 102, such as a local area network (LAN), wide area network (WAN), the Internet, or a combination thereof, connects publishers 104, user devices 106, and a search system 110. The environment 100 may include many thousands of publishers 104 and user devices 106.

A publisher 104 may be any web site that hosts and provides electronic access to a resource by use of the network 102. A web site includes one or more resources 105 associated with a domain name. An example web site is a collection of web pages formatted in hypertext markup language (HTML) that can contain text, images, multimedia content, and programming elements, such as scripts.

A resource includes data that can be provided by the publisher 104 over the network 102 and that is associated with a resource address. Resources include HTML pages, word processing documents, portable document format (PDF) documents, images, video, and feed sources, to name just a few. The resources can include content, such as words, phrases, images and sounds, and may include embedded information (such as meta information and hyperlinks) and/or embedded instructions (such as JavaScript scripts).

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of publishers, there are millions of resources available over the network 102. To facilitate searching of these resources, the search system 110 identifies the resources by crawling the publishers 104 and indexing the resources provided by the publishers 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 uses the indexed cache 112 to identify indexed resources that are relevant to the search queries 109. The search system 110 identifies the resources in the form of search results 111 and returns the search results 111 to the user devices 106 in search results pages. A search result 111 includes data generated by the search system 110 that identifies a resource that satisfies a particular search query, and includes a resource locator for the resource. An example search result 111 can include a web page title, a snippet of text or a thumbnail of an image from the web page along with the URL of the web page.

Search results are ranked based on rank scores related to the resources identified by the search results, such as information retrieval ("IR") scores, a separate ranking of each resource relative to other resources ("page rank") and/or relevance feedback data (e.g., data specifying a frequency of clicks or selections for the resource). In some implementations, the IR scores are computed from dot products of feature vectors corresponding to a search query 109 and a resource, and the ranking of the search results is based on rank scores that are a combination of the IR scores, page rank scores and relevance feedback data. The search results are ordered according to these rank scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher 104 hosting the resource receives the request for the resource from the user device 106 and provides the resource to the requesting user device 106.

Query data and search log data related to a search query 109 received from a user device 106 are stored in data logs 114. The query data is data representing the search queries 109 submitted during the user sessions. The search log data is data representing the search results 111 that are responsive to each of the queries and the actions taken by users in response to the search results. The data representing actions taken in response to the search results 111 are referred to as relevance feedback data ("relevance data"). The actions can include whether a reference to a resource was selected from the search results 111 corresponding to each search query 109 and/or a selection rate for each of the resources referenced in the search results 111 corresponding to each search query 109.

The data logs 114 can be used to map search queries 109 submitted during search sessions to resources that were referenced in search results 111 responsive to the search queries 109 and the actions taken by users in response to the search results 111. If time data are also stored, then the relative times at which those actions were taken can also be determined and stored in the data logs 114.

Query labels can also be stored in the data logs 114. Query labels identify a query category to which a query is classified. For example, a query that is identified as a query that is requesting information related to sports can be assigned a query label "sports." Similarly, a query that is identified as requesting explicit content can be assigned a query label "explicit." Throughout this document, query labels, labels, and query categories are used to refer to categories of content to which queries are related.

Resource labels can also be stored in the data logs 114. Resource labels identify a category to which a resource is classified. For example, a resource that is identified to include sports content can be associated with the resource label "sports," while a resource that is identified as containing explicit content can be associated with the resource label "explicit."

The environment 100 includes a query classification system 120 that identifies a category of content that is likely being requested by the user device 106 that supplied the query. The query classification system 120 can be implemented, for example, in a computing device or system that includes one or more processors. The query classification system 120 can be coupled to the search system 110 through the network 102, and can be permitted by the search system 110 to access the indexed cache 112 and/or the data logs 114.

The query classification system 120 can classify a search query 109 based on search log data corresponding to the search query 109 and resource data for resources that are referenced in search results 111 corresponding to the search query 109. Resource data are data that specify features of a resource. For example, resource data can include data that specify colors of the resource, categories of content to which the resource is directed, a language of content provided by the resource, a location of the resource, and other characteristics of the resource.

The query classification system 120 can identify resources that are referenced in search results 111, for example, by accessing the data logs 114. The query classification system 120 can identify the features of the resources by accessing the resource data for the resources, for example, from the indexed cache 112. The query classification system 120 can identify classifications of the resources based on the resource data and, in turn, classify the search query 109 based on the classifications of the resources.

In some implementations, the resources can be web pages that are relevant to the search query 109 and the resource data can include features of the relevant web pages. The features of the relevant web pages can include, for example, content of the web pages, keywords associated with the web pages, and languages of the web pages. The query classification system 120 can classify web pages based on the features of the web pages or the web pages can be pre-classified and indexed according to their respective classifications. In turn, a query can be labeled based on the classification of the web pages that are associated with the query in the data logs 114.

For example, the query "cricket" can be received from a user device 106. The query "cricket" alone does not provide data as to whether the query is requesting information on the sport cricket, or the insect cricket. However, the search log data can specify that web pages including content related to the sport cricket were selected by users much more often than web pages including content related to the insect cricket. This selection rate information coupled with other data such as the time that the query was received, a language of the query, and other data related to the query can facilitate labeling the query as a sports related query.

While search log data corresponding to a search query 109 can be used to classify the search query 109, it can be beneficial to classify a search query 109 based on features of the search query 109 without requiring access to search log data and/or the search system 110. For example, when a latency constraint for query classification is less than a response time of the search system 110, it may not be feasible to use the search system 110 for query classification. Similarly, there may be times when the search system 110 is unavailable for classifying search queries 109 due, for example, to a maximum load threshold being met. Thus, there are situations in which it is advantageous for search queries 109 to be classified based on features of the search query 109 independent of data provided by the search system 110.

Throughout this document, unlabeled search queries 109 that are to be labeled irrespective of search log data availability are referred to as unserviced queries. For example, a presently received instance of a search query for which no search log data has been generated can be an unserviced query. Although search log data may not have been generated for the presently received instance of the search query, the data logs 114 may include search log data for previously serviced and labeled instances of the unserviced query. Additionally, a presently received instance of a search query for which search log data is currently inaccessible, or inaccessible within a threshold time, can be an unserviced query. Thus, an unserviced query can include any query for which search log data is not accessible within a threshold time.

The threshold time can be defined, for example, based on a latency constraint that specifies a time within which a query is to be classified. Therefore, if the time required to access search log data for a particular query is longer than the latency constraint, then the search log data is inaccessible within the threshold time, and the particular query is an unserviced query.

In some implementations, the query classification system 120 classifies unserviced queries based on a query classification model. The query classification model can be implemented as a vector of feature weights that correspond to query features of a query. The query classification model can be used to classify an unserviced query without accessing search results, relevance data, or other search log data associated with the search query. While the description that follows describes classification of an unserviced query, the query classification system 120 can classify any query based on the query data associated with the query.

The query classification system 120 can include one or more query classification models that are trained to perform binary classification of unserviced queries. A binary query classification model can be trained to classify unserviced queries based on whether the unserviced query is a member of an identified query category. For example, the query classification system 120 can be trained to identify whether an unserviced query is an explicit query (i.e., a query that is requesting explicit resources). A binary query classification model can be implemented, for example, based on a support vector machine or another machine learning algorithm. In some implementations, a parallelized support vector machine can be used. One example of a parallelized support vector machine is described in Chang, E. Y. "Parallelizing Support Vector Machines on Distributed Computers," Proceedings of Neural Information Processing Systems Conference, Dec. 3-6, 2007, Vancouver, BC, Canada.

A binary query classification model can be trained for each query category to which unserviced queries can be classified. For example, a separate query classification model can be trained to classify unserviced queries based on separate query categories including sports, news, and entertainment. Each of the query classification models can be applied to the unserviced query to determine whether the unserviced query is a member of the query category.

If an unserviced query is identified as being a member of (i.e., classified to) more than one query category, the unserviced query can be classified and labeled based on each of the identified categories or, alternatively, to the category for which application of the query classification model identifies a best match. Thus, a series of binary query classification models can be used to classify an unserviced query among multiple available query categories.

Figure 2:
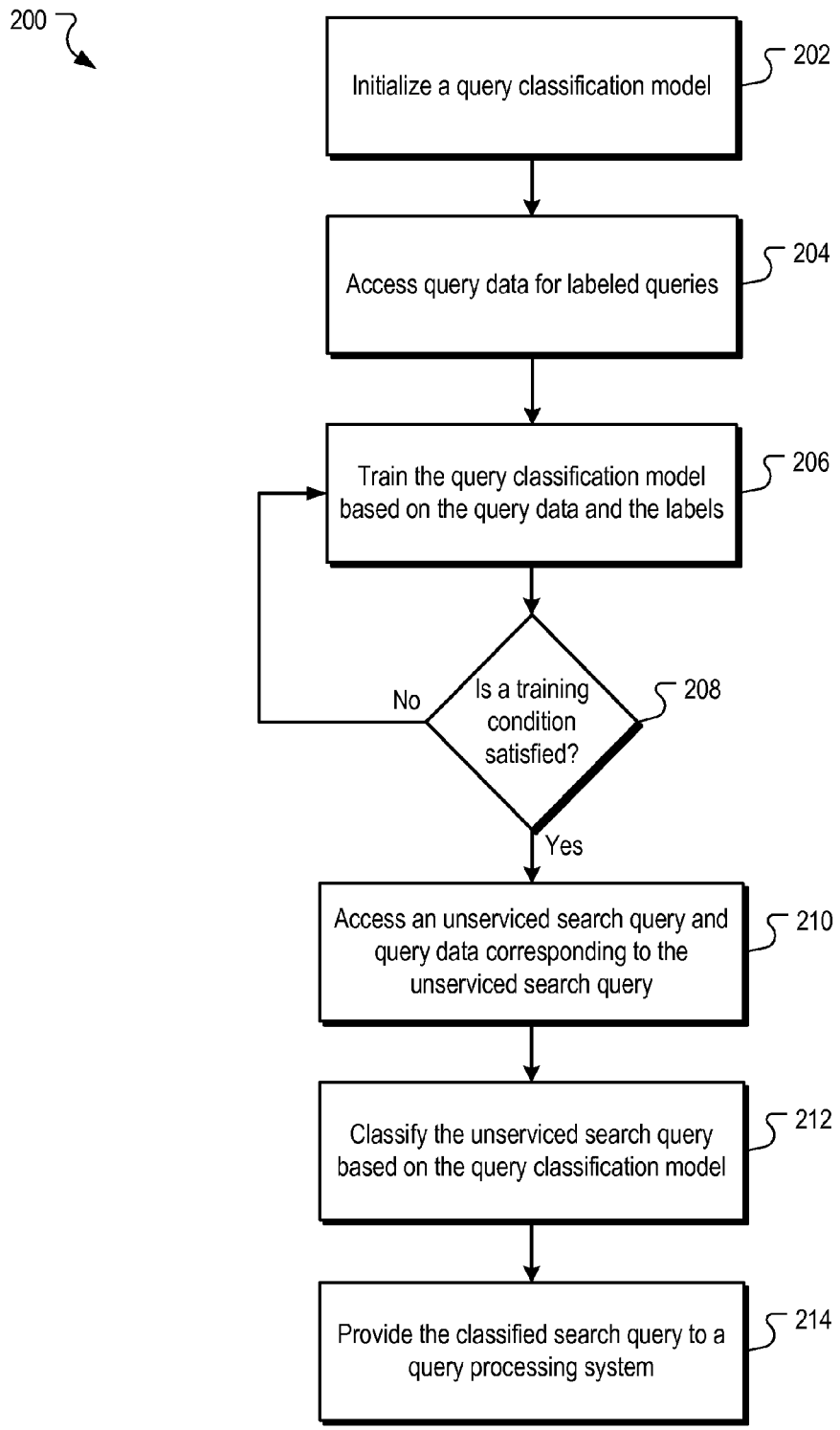
FIG. 2 is a flow chart of an example process for training a query classification model and classifying a query based on the query classification model.

An example process 200 for classifying an unserviced query based on the query classification model is shown in FIG. 2 and discussed in more detail below. The discussion that follows refers to a single query classification model and categorizing queries as either members or non-members of a single query category. While only a single query category and a single binary query classification model are discussed, the description is equally applicable to implementations in which queries are classified into one of multiple query categories.

FIG. 2 is a flow chart of an example process 200 for training a query classification model and classifying a query based on the query classification model. The process 200 can be implemented, for example, by the query classification system 120.

As part of the process 200, a query classification model is initialized (202). In some implementations, the query classification model can be represented as a vector of feature weights. Each value in the vector of weights can correspond to a relative importance of a query feature for classifying queries. The query classification model can be initialized, for example, by setting each value of the vector of feature weights to a default value. For example, each value of the vector of feature weights can be set to a common initial value or each value can be selected independently for each feature weight based on historical data indicative of the importance of each query feature to classifying queries.

Query data for labeled queries are accessed (204). As discussed above, labeled queries are previously received queries that have been identified as members of a particular query category. The query data can be accessed for any and all accessible labeled queries regardless of the manner in which the queries were labeled. For example, query data can be accessed for queries that are labeled based on identified relationships between query labels, the query data and the search log data as described in more detail below with reference to FIG. 3.

The query classification model is trained based on the query data and the labels of the labeled queries (206). In some implementations, the query classification model is trained by iteratively adjusting the vector of feature weights based on a relative importance of each query feature to classification of the query according to the corresponding label. The query classification model can be implemented and trained, for example, as a support vector machine. The query classification model can be trained, for example, by the query classification system 120.

In some implementations, the query data specifies query features of each labeled query. The query data for each labeled query can include, for example, terms and/or phrases that are included in the labeled query, one or more receipt times (i.e., times of day at which the query was received by a search system) associated with the labeled query, a language in which the labeled query was provided, and/or a geographic locations of users that provided the labeled query as well as any other data that is available upon receipt of a query. For example, other data that may be available upon receipt of a query can include an operating system and/or browser from which the query originated and/or an internet protocol address associated with the user device from which the query originated.

In one particular implementation, the data considered are the terms and/or phrases ("terms") of the query and the language in which the query was received. Each of the terms of the query are indicative of one or more topics to which the query is directed. For example, a query including only the term "football" is more likely to be directed to sports than a query including only the term "nude." However, a query including both of the terms "nude" and "football" is more likely directed to explicit content than the query only including the term "football."

The strength of the relationships between the terms of labeled queries and the labels with which the queries are associated can be determined based on a percentage of queries having a particular term or set of terms that also have a common label. For example, if 95% of the queries including the term "nude" are labeled as explicit queries, then there is a relatively strong relationship between the term "nude" and the query being labeled as explicit.

Similarly, the language in which a query was received can be indicative of the content to which the query is directed. For example, a query including the term "hora" may be labeled as explicit when received in a Swedish query because this term means "whore" in Swedish. In contrast, a Spanish query including the term "hora" may be labeled as non-explicit because "hora" in Spanish means "hour." Thus, the language in which a query was received can be used as an indication of the topic to which a query is directed because commonly spelled words can have different meanings in different languages.

The language in which a query is received can be identified, for example, based on a language indicator corresponding to a language selected by a user in the user device. The language indicator can include, for example, a two letter language code and/or a dialect subcode. The language code and/or dialect subcode can be detected, for example, from data received with the search query.

In some implementations, the receipt time of a query can also be indicative of the content to which the query is directed. For example, a query including the term "nude" that is received at 10:30 am may be labeled as a non-explicit query if search results referencing nude art webpages were selected most often at this receipt time. However, a query including the term "nude" that is received at 1:30 am may be labeled as an explicit query if search results referencing explicit content websites were selected most often at this receipt time. The relationships between the receipt times for queries and the labels of the queries can be identified based on a portion of the labels having a common receipt time that also have a common label.

The vector of feature weights can be iteratively adjusted to represent relationships between the query features of labeled queries and a corresponding label. For example, if inclusion of a particular word is highly indicative of an explicit query, this particular word can correspond to a relatively high weight in the vector of feature weights. Therefore, a query including the particular word is more likely to be identified as an explicit query. The relationships and the corresponding feature weights are identified, for example, by applying the query classification model to the labeled queries and adjusting each feature weight so that application of the query classification model results in proper classification of the queries.

A determination is made as to whether a training condition is satisfied (208). In some implementations, the vector of feature weights and, in turn, the query classification model is defined as trained when the training condition is satisfied. The training condition can be based, for example, on achieving at least a minimum difference between the vector of feature weights and all values resulting from application of the query classification model to the labeled queries.

For example, results of a dot product of the vector of feature weights and query features for each of the labeled queries can be compared to the vector of feature weights. If a minimum threshold distance is not realized between the vector of feature weights and a closest result for each of the labeled queries, the training condition is not satisfied and the query classification model continues to be trained based on the query data and the labels (206). If the minimum threshold distance is achieved between the vector of feature weights and a closest result for each of the labeled queries, the training condition is satisfied. When the training condition is satisfied, the query classification model is defined as trained and available to classify unserviced queries.

An unserviced search query and query data corresponding to the unserviced search query are accessed (210). The query data corresponding to the unserviced search query includes one or more query features similar to those described with reference to the labeled queries. The unserviced search query and query data corresponding to the unserviced search query can be accessed, for example, by the query classification system 120.

The unserviced search query is classified based on the query data and the query classification model (212). In some implementations, the query classification model is applied to the query data to determine whether the unserviced search query is a member of a particular query category. For example, a result of a dot product of the query classification model and the query data can be compared to classification thresholds that define whether queries are members or non-members of the particular query category. If the result satisfies a first classification threshold, the unserviced query is classified as a member of the particular query category. If the result satisfies a second classification threshold, the unserviced query is classified as a non-member of the particular query category. The first threshold and the second threshold can have the same value or different values.

For example, a first classification threshold and a second classification threshold can each be set to determine whether an unserviced query is an explicit query. The first threshold can be set to a value of positive one and the second threshold can be set to a value of negative one. Therefore, if the result of the dot product of the query classification model and the query data of an unserviced query is positive one or greater, the unserviced query is classified as being an explicit query. In contrast, if the result of the dot product is negative one or less, the unserviced query is classified as being a non-explicit query. If the result of the dot product is between positive one and negative one, the unserviced query can remain unclassified.

The classified search query is provided to a query processing system (214). In some implementations, the classified search query is provided with classification data that identifies a query category to which the classified search query corresponds. For example, an unserviced query that is classified as being a query requesting explicit content can be provided with a query label that identifies the search query as an explicit query. Similarly, an unserviced query that is classified as a query unrelated to explicit content can be provided with a query label that identifies the search query as a non-explicit query. The query processing system can be any computing or processing system that can take action responsive to a query.

In some implementations, the classified search query can be provided to a search system that generates search results responsive to the classified search query. Search results that are generated based on a classified search query can include references to resources that are more relevant to the search query than might otherwise be identified based on the search query alone. For example, a wide range of resources including resources about insects or sports may be identified for the search query "cricket" if the query is not associated with a query category. However, if the query "cricket" is classified as a sports related search query, the search results can be filtered and/or otherwise ordered based on this classification.

Similarly, the resources that are identified by a search system in response to certain search queries may include explicit resources and non-explicit resources. An explicit resource is a resource that contains explicit content (e.g., pornographic content, graphic violence, or other content that may be offensive to viewers). However, if the search query is labeled as a non-explicit query, then the search system can filter and/or otherwise order the search results so that non-explicit resources are either removed or referenced at lower positions in the search results.

In some implementations, the classified search query can be provided to an advertisement management system 150. The advertisement management system 150 can be a system that selects advertisements for presentation with search results or resources selected from search results. Providing the classified search query to the advertisement management system 150 can facilitate selection of advertisements that are more related to the search query than might otherwise be selected.

Continuing with the example above, advertisements directed to sporting equipment, and in particular cricket sporting equipment, can be presented in response to the search query "cricket" when the query is labeled as a sports query. Similarly, advertisements for explicit products or services can be provided when a query is identified as an explicit query, and not provided when a query is identified as a non-explicit query.

Providing advertisements that are more relevant to a search query can increase the effectiveness of the advertisements provided. Therefore, when classified queries are provided, advertisers can achieve a higher return on advertising dollars spent and publishers can more efficiently allocate advertising space associated with resources. Thus, providing a classified search query to an advertisement management system 150 can facilitate more efficient and effective advertising by increasing the relevance of advertisements that are selected based, at least in part, on a search query.

Figure 3:
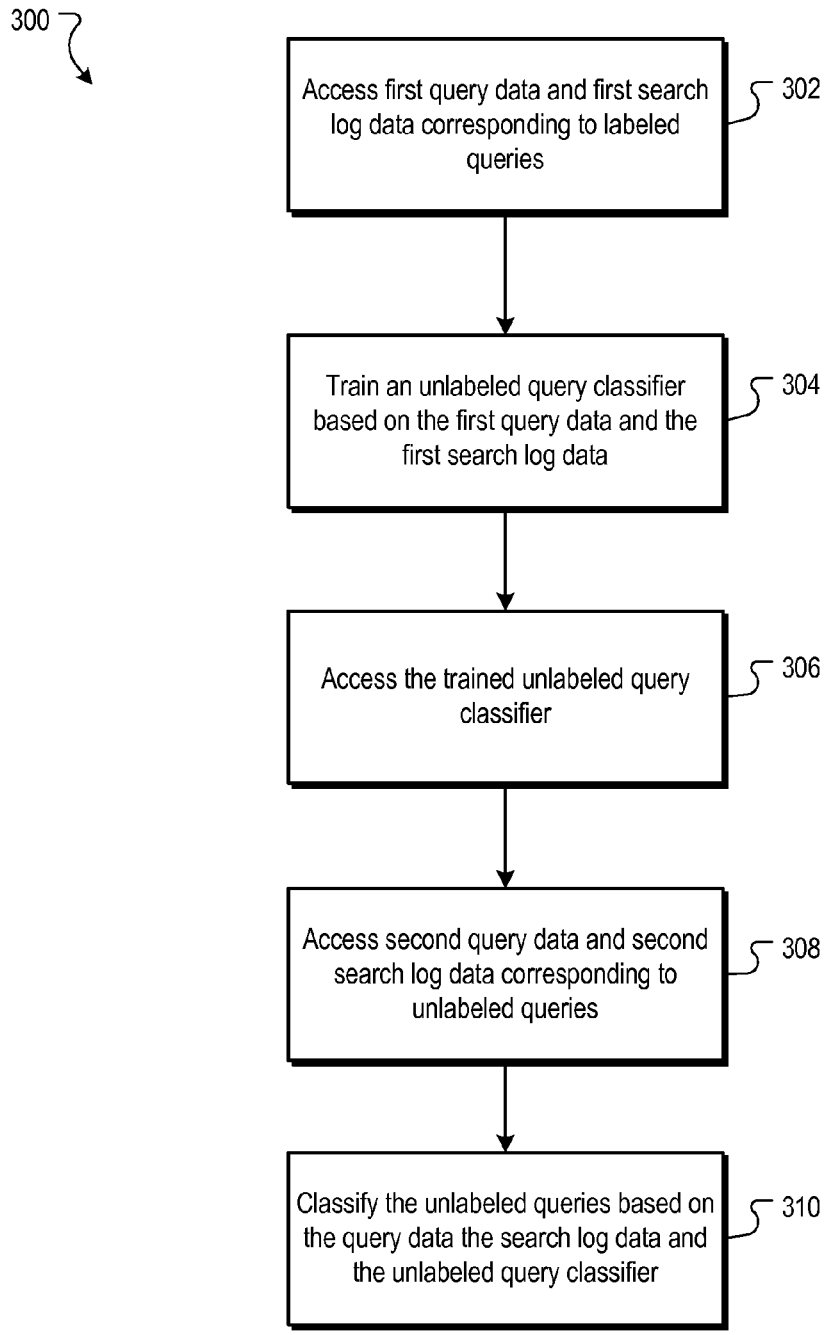
FIG. 3 is a flow chart of an example process for labeling search queries.

FIG. 3 is a flow chart of an example process 300 for labeling search queries. The process 300 can be implemented, for example, by the query classification system 120 including at least one processing device.

As part of the process 300, first query data and first search log data corresponding to labeled queries are accessed (302). In some implementations, the first query data specifies features of each labeled query and the first search log data includes data generated by a search system in response to each of the labeled queries.

The first query data for each labeled query can include terms and/or phrases that are included in the labeled query, one or more receipt times (i.e., times of day at which the query was received by a search system) associated with the labeled query, a language in which the labeled query was provided, and/or geographic locations of users that provided the labeled query as well as any other data that is available upon receipt of a query. For example, other data that may be available upon receipt of a query can include an operating system and/or browser from which the query originated and/or an internet protocol address associated with the user device from which the query originated In one particular implementation, the data considered for labeling a query are the terms and/or phrases ("terms") of the query and the language in which the query was provided. As described above with reference to FIG. 2, each of the terms of the query are indicative of one or more topics to which the query is directed. Therefore, the terms of the query can also be related to a label for the query.

The strength of the relationships between query terms of labeled queries and the labels with which the queries are associated can be determined based on a portion of queries having a particular term or set of terms that also have a common label. For example, if 95% of the queries including the term "nude" are labeled as explicit queries, then there is a fairly strong relationship between the term "nude" and a query being labeled as explicit.

Also described above with reference to FIG. 2, the language in which a query was received can be indicative of the content to which the query is directed. Therefore, the language of a query can also be related to a label for the query.

The first search log data can include, for example, references to resources that were identified in response to the search query, user actions associated with each resource when provided in search results responsive to the search query, and a number of resources provided in response to the search query.

For example, first search log data for the search query "cricket" may include data identifying web pages including content for the sport cricket as well as web pages including content about the insect cricket that were provided in search results responsive to the query. The first search log data can further include data identifying a relevance feedback (e.g., a click rate) for each of the web pages when presented in response to the search query "cricket."

The labeled queries can be previously unlabeled queries that were labeled by manual or automated processes. In some implementations, a subset, or a full set, of the previously received queries can be labeled through a manual process. Manual classification and labeling of the subset of previously received queries can be performed, for example, by query reviewers. The query reviewers can be users that classify each of the queries based on whether the query is a member of a specified query category.

For example, each of the query reviewers can be provided a group of unlabeled queries and search results for each of the unlabeled queries. The query reviewers can be instructed to classify each unlabeled query based on whether the query is directed to explicit material. The query reviewers can classify each unlabeled query, for example, based on the words and/or phrases of the query as well as other factors such as the content of web pages that were referenced in search results responsive to the query.

A similar analysis and classification can be automated, for example, using a decision tree classifier that can classify the unlabeled queries. The decision tree classifier can be provided with reference criteria against which data associated with the unlabeled queries can be compared. The reference criteria can include criteria similar to the criteria by which query reviewers classify unlabeled queries. The unlabeled query can be classified as a member of a query category, for example, based on a threshold amount (e.g., number or percentage) of the reference criteria associated with the query category being associated with the previously-received query. A query label corresponding to the query category can be associated with the query.

There may be many thousands or millions of unlabeled queries stored, for example, in a data log, with each unlabeled query being associated with a unique combination of query data and search log data. Therefore, it may not be effective or efficient to label each of the unlabeled queries manually. For example, there may be more subtle relationships between the search log data, query data and labels than those identified and provided to query reviewers. These more subtle relationships can be modeled, for example, by a machine learning system. In turn, unlabeled queries can be more accurately labeled based on the modeled relationships. In some implementations, an unlabeled query classifier can be used to facilitate classification of unlabeled queries.

An unlabeled query classifier is trained based on the first query data and the first search log data (304). In some implementations, the unlabeled query classifier can be implemented as a decision tree classifier similar to that described above. In other implementations, the unlabeled query classifier can be implemented, for example, as a vector of feature weights that correspond to the features of queries that are defined by the search log data and that indicate the significance of each feature with respect to whether a query is classified as corresponding to the classification label represented by the vector of feature weights. As described above, the weight of each feature can correspond to the relative importance of the feature as it relates to the search query being associated with a particular label.

In some implementations, the unlabeled query classifier can be trained based on identified relationships between the labels, the query data and the search log data for the labeled queries. The unlabeled query classifier can be trained and defined as trained, for example, in a manner similar to that described above with reference to FIG. 2. However, unlike the process described with reference to FIG. 2, the unlabeled query classifier is trained to label queries based on the query data and the search log data, rather than the query data alone. Therefore, the vector of feature weights for the unlabeled query classifier includes weights corresponding to features of the query that are specified by the search log data.

The unlabeled query classifier is accessed (306). In some implementations, the accessed unlabeled query classifier is trained based on the first query data and the first search log data, as described above. The unlabeled query classifier can be accessed, for example, by the query classification system 120.

Second query data and second search log data corresponding to unlabeled queries are accessed (308). In some implementations, the second query data for each labeled query can include terms and/or phrases that are included in the unlabeled query, one or more receipt times (i.e., times of day at which the unlabeled query was received by a search system) associated with the labeled query, a language in which the unlabeled query was provided, and/or a geographic locations of users that provided the unlabeled query as well as any other data that is available upon receipt of a query. For example, other data that may be available upon receipt of a query can include an operating system and/or browser from which the query originated and/or an internet protocol address associated with the user device from which the query originated.

The second search log data can include, for example, references to resources that were identified in response to the search query, user actions associated with each resource when provided in search results responsive to the search query and a number of resources provided in response to the search query.

The unlabeled queries are classified based on the query data, the search log data and the unlabeled query classifier (310). In some implementations, the unlabeled queries are classified using a decision tree classifier. In other implementations, the unlabeled queries are classified based on a result of a dot product of the feature vector for the query and the vector of feature weights for the unlabeled query classifier. If the result satisfies a first threshold, the unlabeled query is labeled (i.e., classified) as a member of the particular query category. If the result satisfies a second threshold, the unlabeled query is labeled as a non-member of the particular query category. The first threshold and the second threshold can each have a common value or the first threshold and the second threshold can each have different values.

Classification data specifying whether the query is a member of the particular query category is stored at a memory location associated with the query. For example, query data representing a label associated with the query can be stored at a memory location of the search log associated with the query. The data representing the label associated with the query can be used to train the query classification model as discussed with reference to FIG. 2.

Each unlabeled query that is accessible can be labeled (i.e., classified) in a manner similar to that described above. In some implementations, all of the unlabeled queries are labeled, but the number of unlabeled queries that are classified can be determined based on processing resources, the number of unlabeled queries available, as well as other implementation details.

Figure 4:
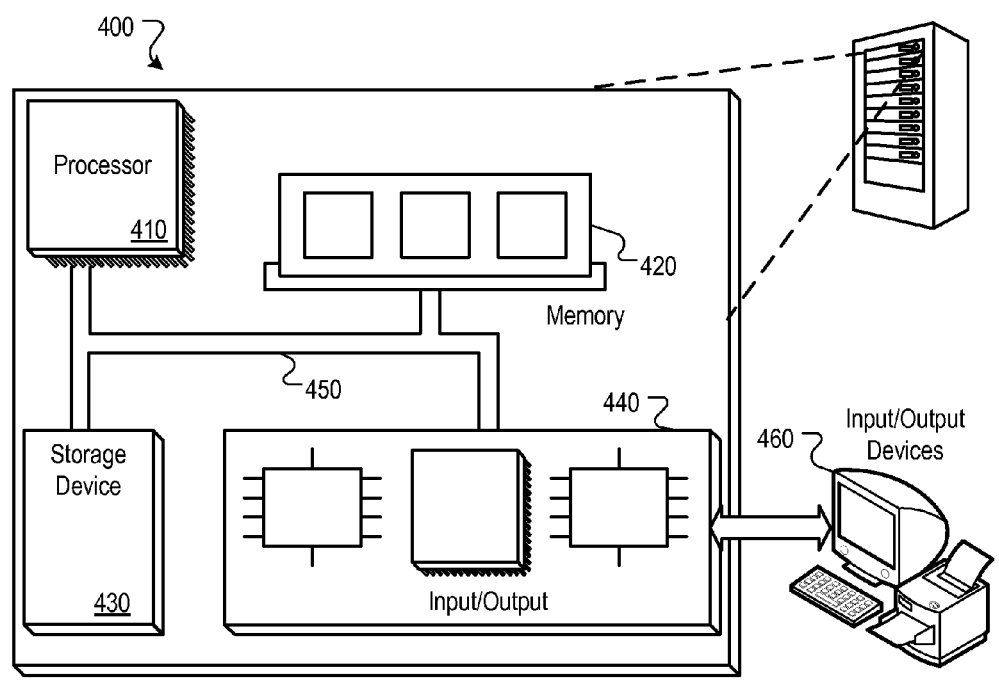
FIG. 4 is a block diagram of an example computer system that can be used to label unserviced queries.

FIG. 4 is a block diagram of an example computer system 400 that can be used to label unserviced queries. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, or set-top box television client devices.

The query classification system 120 and/or search system 110 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The query classification system 120 and/or search system 110 can be implemented in a distributed manner over a network, such as a server farm, or can be implemented in a single computer device.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system," "processing devices" and "subsystem" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. While reference is made to delivering advertisements, other forms of content including other forms of sponsored content can be delivered.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying, by a data processing device, an unserviced query, the unserviced query being a query for which search log data is inaccessible to the data processing device within a latency constraint that specifies a time within which a query is to be classified, the search log data being data specifying resources that have been accessed through search results pages that were previously provided in response to search queries;
   identifying query data for the unserviced query, the query data specifying at least one of a word of the unserviced query, a language of the unserviced query, a geographic location associated with the unserviced query, or a receipt time of the unserviced query;
   classifying, by a data processing device, the unserviced query based on application of a query classification model to the query data for the unserviced query to generate a classified query, the unserviced query being classified to a query category from a set of query categories including a non-explicit query category; and
   providing, by the data processing device, the classified query to a query processing system.

2. The method of claim 1, wherein the query processing system is a query search system.

3. The method of claim 1, wherein the query processing system is an advertisement management system.

4. The method of claim 1, wherein the geographic location associated with the unserviced query comprises a geographic location of a user device from which the unserviced query originates.

5. The method of claim 1, wherein the language of the unserviced query comprises a language indicator corresponding to a language selected in a user device from which the unserviced query originates.

6. The method of claim 1, wherein the query classification model comprises a vector of feature weights corresponding to features of queries, and wherein the query classification model is defined as trained when a training condition is satisfied.

7. The method of claim 1, wherein the unserviced query is classified as a member of a query category that is indicative of a category of content to which the unserviced query corresponds.

8. The method of claim 7, wherein the query category comprises an explicit content category.

9. The method of claim 1, further comprising:
   accessing first query data and first search log data corresponding to labeled queries, with the first query data specifying features of each labeled query and the first search log data including data generated by a search system in response to the labeled queries; and
   training the unlabeled query classifier based on the first query data and the first search log data.

10. The method of claim 9, further comprising:
    accessing the trained unlabeled query classifier;
    accessing second query data and second search log data corresponding to unlabeled queries, with the second query data specifying features of each unlabeled query and the second search log data including data generated by a search system in response to the unlabeled queries;
    classifying the unlabeled queries with the unlabeled query classifier based on the second query data and the search log data; and
    labeling the unlabeled queries based on the classification.

11. A system, comprising:
    a data store storing query data for a plurality of labeled queries; and
    a query classification system coupled to the data store, the query classification system comprising one or more processors configured to perform operations comprising:
       identifying an unserviced query, the unserviced query being a query for which search log data is inaccessible to the query classification system within a latency constraint that specifies a time within which a query is to be classified, the search log data being data specifying resources that have been accessed through search results pages that were previously provided in response to search queries;
       identifying query data for the unserviced query, the query data specifying at least one of a word of the unserviced query, a language of the unserviced query, a geographic location associated with the unserviced query, or a receipt time of the unserviced query;
       classifying the unserviced query based on application of a query classification model to the query data for the unserviced query to generate a classified query, the unserviced query being classified to a query category from a set of query categories including a non-explicit query category; and
    providing the classified query to a query processing system.

12. The system of claim 11, wherein the query classification system is coupled to the query processing system.

13. The system of claim 11, wherein the query processing system is a search system.

14. The system of claim 11, wherein the query processing system is an advertisement management system.

15. The system of claim 11, wherein the query classification system comprises an unlabeled query classification model configured to:
- access query data and search log data corresponding to a plurality of unlabeled queries, the query data specifying features of each unlabeled query, the search log data including data generated by a search system in response to the unlabeled queries; and
- classify the unlabeled queries based on the query data and the search log data.

16. The system of claim 11, wherein the unserviced query is classified as a member of a query category that is indicative of a category of content to which the unserviced query corresponds.

17. The system of claim 16, wherein the query category comprises an explicit query category.

* * * * *

UNITED STATES PATENT AND TRADEMARK OFFICE
CERTIFICATE OF CORRECTION

| | | |
|---|---|---|
| PATENT NO. | : 8,560,539 B1 | Page 1 of 1 |
| APPLICATION NO. | : 12/511450 | |
| DATED | : October 15, 2013 | |
| INVENTOR(S) | : Engebretsen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this
Third Day of March, 2015

Michelle K. Lee
*Deputy Director of the United States Patent and Trademark Office*